United States Patent
Stroes et al.

(10) Patent No.: US 7,639,980 B2
(45) Date of Patent: Dec. 29, 2009

(54) METHOD AND APPARATUS FOR RECEIVING DUAL BAND SIGNALS FROM A COMMON ORBITAL LOCATION WITH AN OUTDOOR UNIT USING A FREQUENCY SELECTIVE SUBREFLECTOR AND ADDITIONAL ANTENNA FEED

(75) Inventors: Gustave R. Stroes, Beverly Hills, CA (US); Patrick J. Loner, Los Angeles, CA (US); Joseph Santoru, Agoura Hills, CA (US); Ernest C. Chen, San Pedro, CA (US); Navid Motamed, Beverly Hills, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 570 days.

(21) Appl. No.: 11/602,823

(22) Filed: Nov. 21, 2006

(65) Prior Publication Data

US 2008/0120654 A1 May 22, 2008

(51) Int. Cl.
*H04Q 7/20* (2006.01)

(52) U.S. Cl. ............... 455/3.02; 455/3.01; 455/3.03; 455/427; 455/428; 455/12.1; 343/756; 343/840; 343/DIG. 2; 343/781 R

(58) Field of Classification Search ....... 455/3.01–3.06, 455/427, 428, 429, 422.1, 403, 11.1, 12.1, 455/13.1, 13.2, 500, 517; 343/756, 781, 343/840, DIG. 2, 781 R
See application file for complete search history.

(56) References Cited

U.S. PATENT DOCUMENTS

| 6,504,514 | B1 | 1/2003 | Toland et al. |
| 6,577,283 | B2 | 6/2003 | Wu et al. |
| 6,633,744 | B1 * | 10/2003 | Howell .................. 455/12.1 |
| 6,747,608 | B2 | 6/2004 | Wu |
| 6,947,702 | B2 | 9/2005 | Green, Sr. ............... 455/3.02 |
| 2001/0000123 | A1 * | 4/2001 | Benjauthrit ............. 343/757 |

OTHER PUBLICATIONS

Non-final Office Action dated Jun. 13, 2008 in U.S. Appl. No. 11/602,822, filed Nov. 21, 2006 by Gustave Stroes et al.
Notice of Allowance dated Oct. 7, 2008 in U.S. Appl. No. 11/602,822, filed Nov. 21, 2006 by Gustave Stroes et al.

* cited by examiner

*Primary Examiner*—Keith T Ferguson

(57) ABSTRACT

A system 10 that includes a first satellite 14 at a first orbital slot B includes a first transponder 32 generating a first downlink signal at a first frequency and a second downlink signal at a second frequency. An outdoor unit 50 is directed toward the first satellite 14. The outdoor unit includes a support structure 80 and a reflector 64 coupled to the support structure 80 and reflecting the first downlink signal from a first satellite. A first reflector reflects the second downlink signal from the first satellite. A first feed 66 is coupled to the support structure and receives the first downlink signal. A reflector 72 having frequency selective surface 74 coupled to the support structure 80 reflects the second downlink signal and passes the first downlink signal therethrough. The second feed 70B is coupled to the support structure 80 and receives the second downlink signal reflected from the frequency selective surface 74.

44 Claims, 3 Drawing Sheets

US 7,639,980 B2

METHOD AND APPARATUS FOR RECEIVING DUAL BAND SIGNALS FROM A COMMON ORBITAL LOCATION WITH AN OUTDOOR UNIT USING A FREQUENCY SELECTIVE SUBREFLECTOR AND ADDITIONAL ANTENNA FEED

FIELD

The present disclosure relates generally to a satellite signal receiving outdoor unit, and more particularly, to an outdoor unit having multiple feeds for receiving various frequency bands.

BACKGROUND

The statements in this section merely provide background information related to the present disclosure and may not constitute prior art.

Satellite data and television systems use an outdoor unit that includes a reflector that directs satellite signals to a feed. The reflector is typically aligned at a particular satellite so that the signals from the satellite are concentrated at the feed. This allows the feed to receive a strong signal. Satellites typically generate one frequency and the feed is tuned for that particular frequency.

Some satellite systems include satellites that are capable of transmitting more than one frequency. That is, a satellite may be provided with more than one transponder that is capable of generating signals at another frequency than another transponder on the same satellite. The second frequency signals are thus not utilized.

Satellite television providers try to increase the amount of services they provide. Additional satellites are expensive and, thus, maximizing the amount of services from existing satellites is an important goal.

Therefore, it is desirable to utilize signals at a different frequency than a primary frequency in a satellite system

SUMMARY

In one aspect of the disclosure, a system includes a first satellite at a first orbital slot having a first transponder generating a first downlink signal at a first frequency and a second downlink signal at a second frequency. An outdoor unit is directed at the first satellite and includes a support structure, a first reflector coupled to the support structure reflecting a first downlink signal from the first satellite. The first reflector also reflects a second downlink signal from the first satellite. A first feed is coupled to the support structure and receives the first downlink signal. A frequency selective surface coupled to the support structure reflects the second downlink signal after the first reflector and passes the first downlink signal therethrough. A second feed is coupled to the support structure and receives the second downlink signal reflected from the frequency selective surface.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
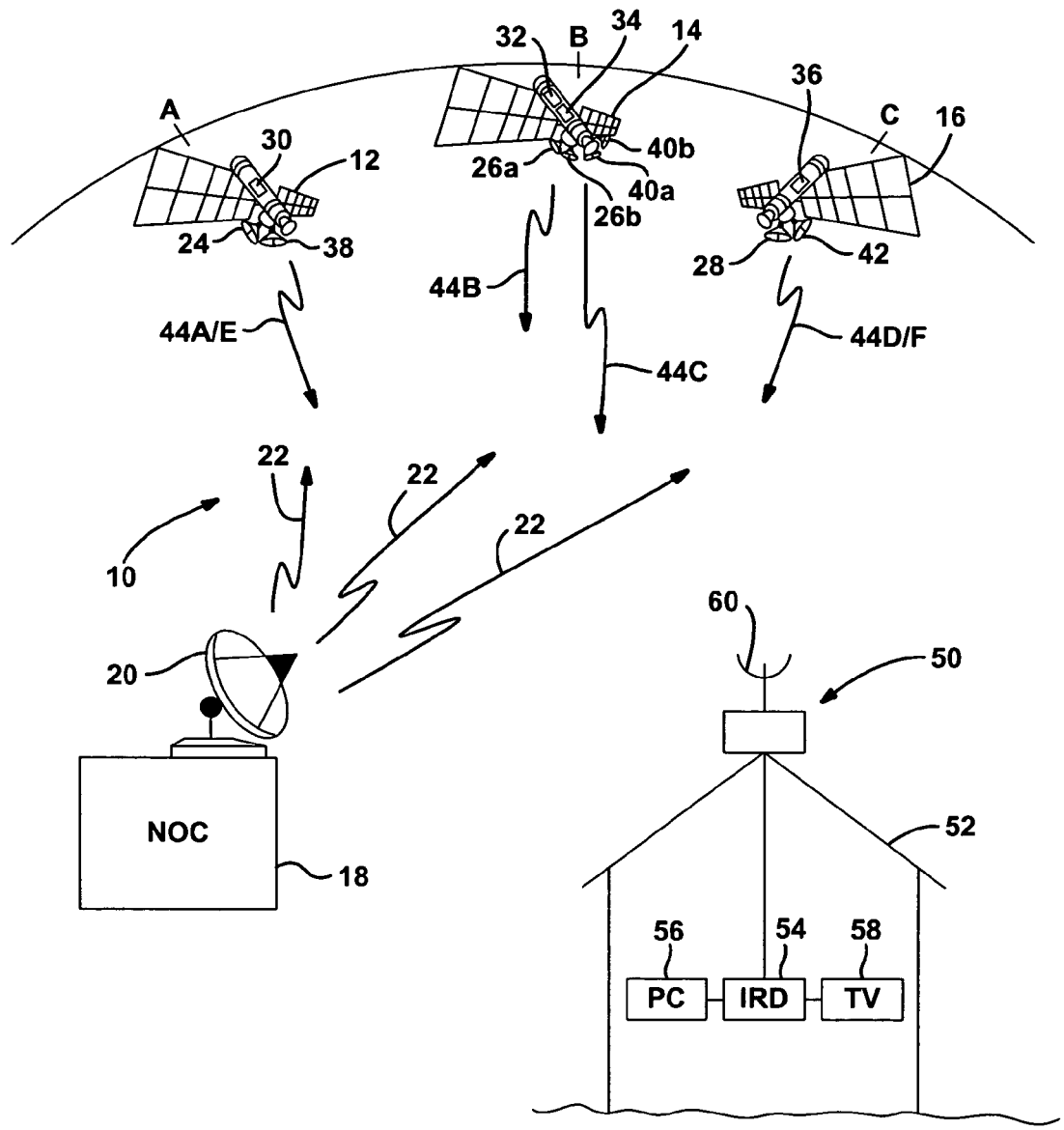
FIG. 1 is a system view of a satellite transmission system formed according to the present disclosure.

The following description is merely exemplary in nature and is not intended to limit the present disclosure, application, or uses. It should be understood that throughout the drawings, corresponding reference numerals indicate like or corresponding parts and features. The present disclosure is described with respect to a satellite television system. However, the present disclosure may be used for various uses including satellite transmission and data transmission and reception for home or business uses.

Referring now to FIG. 1, a satellite system 10 according to the present disclosure includes satellites 12, 14 and 16 that receive uplink signals from a network operation center 18. The network operation center includes a transmitting antenna 20 that may be implemented as a plurality of transmitting antennas. The transmitting antenna 20 transmits uplink signals 22 to respective receiving antennas 24, 26 and 28 on satellites 12, 14 and 16. Satellite 14 may also include two satellite antennas 26A and 26B, although one receiving antenna may be provided. Satellite 12 includes a transponder 30. Satellite 14 includes two transponders 30 and 34. Satellite 16 includes a transponder 36. Satellite 12 may also include a transmitting antenna 38. Satellite 14 may include one or two transmitting antennas 40A and 40B. Satellite 16 includes a transmitting antenna 42. The transmitting antennas 38, 40A, 40B and 42 generate downlink signals 44A, 44B, 44C, 44D 44E and 44F. As will be further described below, transponders 32 and 34 may generate downlink signals 44B and 44C having different downlink frequencies. For example, downlink signals 44B, 44E and 44F may be at the Ku band. Downlink signals 44A, 44C and 44D may be at the Ka band. It should be noted two collocated satellites transmitting different frequencies may replace satellite 14.

The satellites 12, 14 and 16 may be positioned at various orbital spots A, B and C. In one configuration, orbital spots A, B and C comprise orbital spots 99° West, 101° West and 103° West, respectively. The orbital spacings are consecutive geosynchronous orbital spacings. However, the orbital spacings need not be consecutive. It should be noted that the government requires two-degree spacing between orbital slots for Ka band in the geosynchronous plane. Spacing for Ku band is nine degrees. The present satellites 12, 14 and 16 are geosynchronous satellites.

An outdoor unit 50 coupled to a building 52 such as a home, multi-dwelling unit or business, receives the satellite downlink signals 44 and provides the signals to a processing circuit such as an integrated receiver decoder 54. Data signals may be used by the computer 56 and television signals may be used by the television 58. The outdoor unit 50 includes a receiving antenna structure 60.

Figure 2:
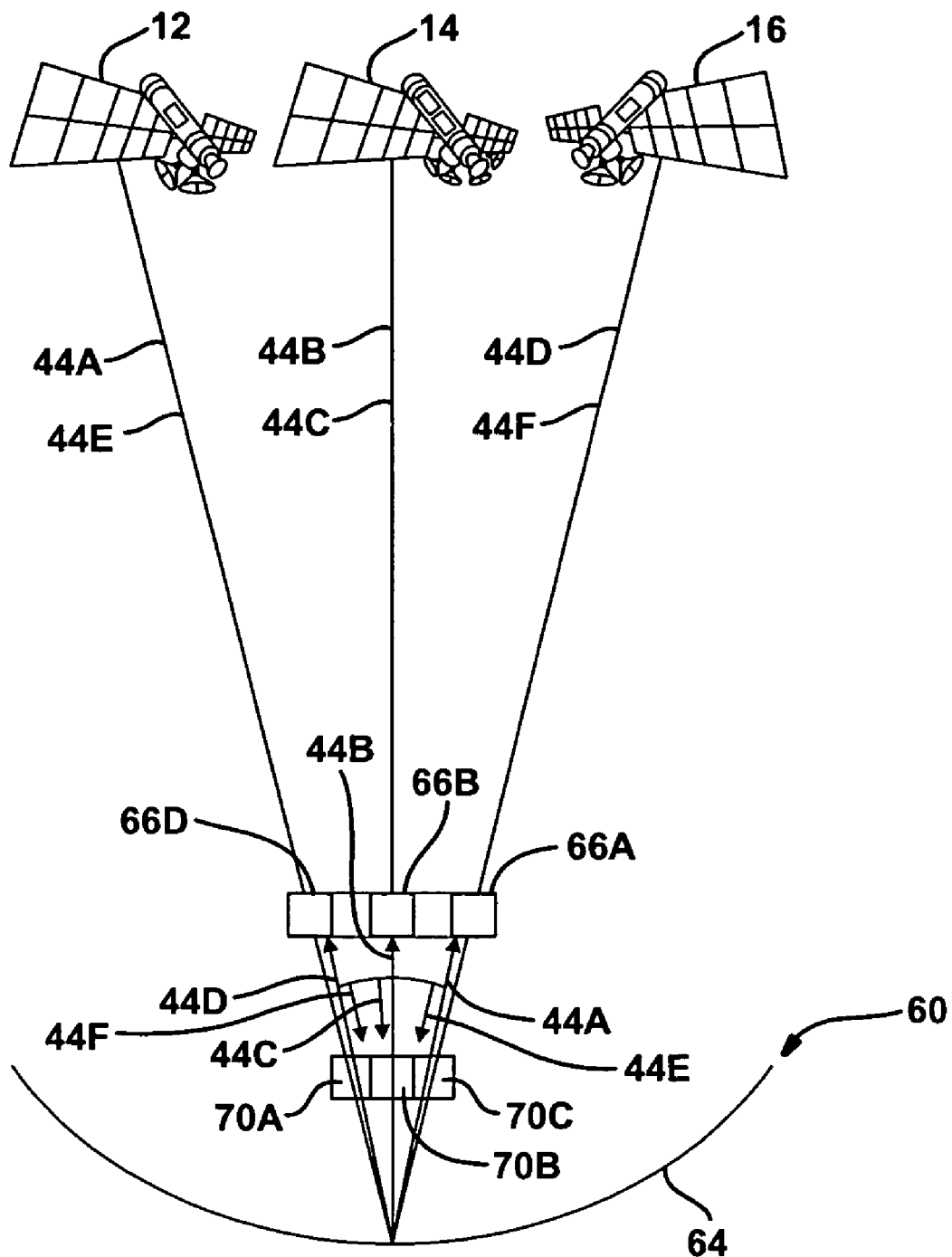
FIG. 2 is a diagrammatic view of the system and the associated axis.

Referring now to FIG. 2, a simplified diagram of a top view of the downlink signals 44A, 44B, 44C relative to the satellites 12, 14 and 16 and the receiving antenna structure 60. The primary axis 94 (of FIG. 3) of the reflector 64 is along the downlink direction 44B so that downlink signals 44B reflect from the antenna structure and are reflected to feed 66B. Downlink signals 44A reflect to feed 66A and downlink 64D reflect to feed 66D. As is illustrated, the feeds are slightly spaced apart and receive the particular satellite signal. A secondary reflector 72 with a frequency selective surface is used to reflect and transmit various downlink signals as will be described below.

Figure 3:
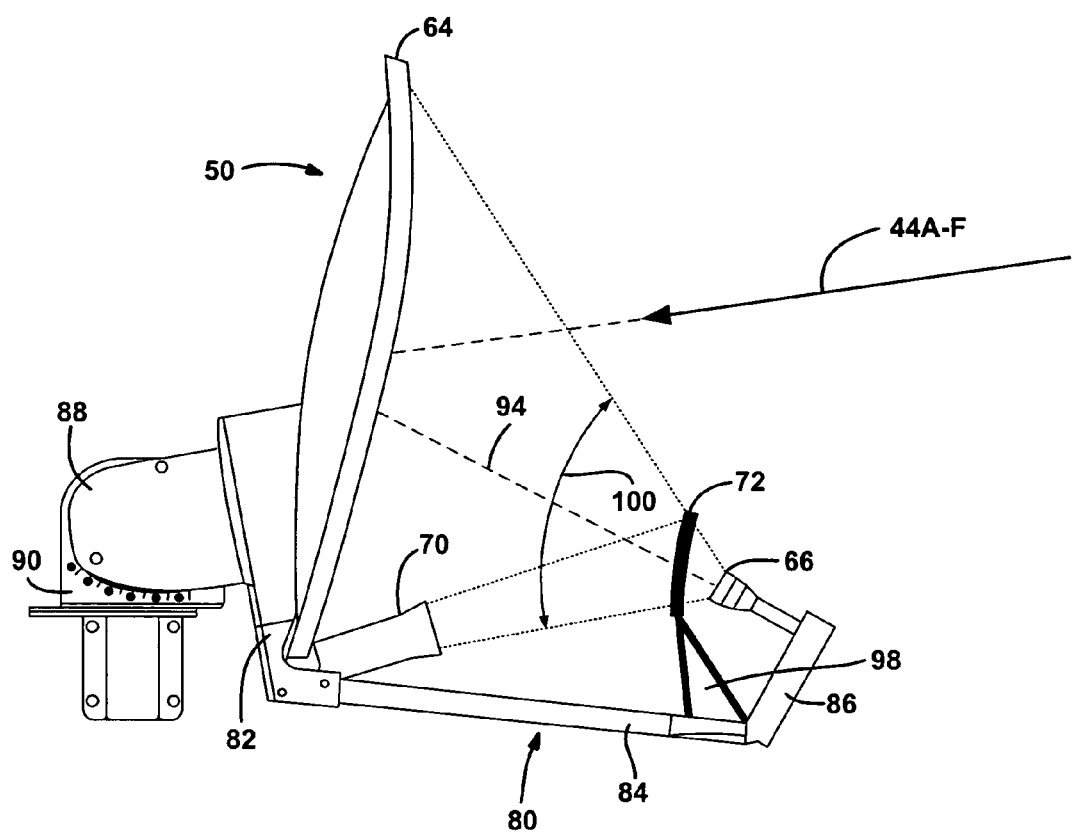
FIG. 3 is a side view of a first embodiment of an outdoor unit.

As will further be described below, additional feeds 70A-C may be included in the system. Three additional feeds are illustrated in FIG. 3. In a constructed embodiment, six feeds may be provided so that two different frequencies from each satellite may be provided, received and utilized. What is important is that feeds 66 receive a different frequency than the secondary feeds 70A-C. In one embodiment, a feed 66B and feeds 70A, 70B and 70C are provided. Feed 66B receives one frequency while feeds 70A, 70B and 70C receive a second frequency. The first frequency may be Ka band and the second frequency may be Ku band, or vice versa. In another embodiment one feed 70B is provided with feeds 66A,B,D. The present disclosure may use one or more of feeds 66A,B,D and one of feeds 70A,B,C.

Referring now to FIG. 3, an outdoor unit 50 formed according to the present disclosure is illustrated. In this embodiment, the arrows represent signals 44A, 44B, 44C and 44D. In addition, a separate pair of signals may also be generated from satellites 12 and 16 as signals 44E and 44F. As mentioned above, all of the signals need not be provided. In fact, only two different frequencies, preferably from the same satellite, may be used in an implementation of the disclosure. Reflector 64 receives one or all of the signals for the particular embodiment along a primary axis 94. Along the primary axis 94 the signals are concentrated on the feed 66. Feed 66 is meant to illustrate one feed or several feeds placed adjacent to each other. The feed 66 is coupled to support structure 80 which includes a reflector support 82, an extension portion 84 and a feed support 86. As illustrated, feed 66 is coupled to feed support 86.

Additional feed or feeds 70A-C are provided coupled to the extension portion 84 of support structure 80. Those skilled in the art will recognize that various positions including coupling the additional feed 70 to reflector support 82 may be provided. In this embodiment, feed 70 is meant to represent one or all of feed 70A-70C of FIG. 2.

Secondary reflector 72 has a frequency selective surface 74 that allows certain frequencies to pass therethrough and certain frequencies to be reflected therefrom. The secondary reflector 72 with the frequency selective surface 74 may be coupled in various manners including different portions of the support structure 80 including the feed support 86 or the extension portion 84 using a bracket 98.

It is desirable to provide the secondary reflector 72 in such a position that it intersects the primary axis 94. The length of the primary surface is such that it intersects most of or all of the signal reflected from the reflector 64. That is, reflector 72 receives the signals reflected in the reflected arc 100. The secondary reflector 72 may be concave or convex in shape. What is important is that the signals of the desired frequency reflected from the frequency selective surface are directed to the additional feed or feeds 70.

As mentioned above, various configurations of the present disclosure may be formed. In one embodiment, a single feed 66 and a single feed 70 may be used to receive signals of different frequencies from the same satellite. In this embodiment, the feed 66 may be configured to receive Ku band signals and the frequency selective surface to transmit the Ku band while reflecting the Ka band to the Ka band feed 70. In another embodiment, two or more Ku band feeds may be provided while a single Ka feed 70 may be provided. In another embodiment, one Ku feed 66 may be provided while two or more Ka band feeds 70 may be provided.

In another embodiment, the frequency selective surface may be configured to pass Ka band signals while reflecting KU band signals to the feeds 70. In this embodiment, multiple feeds may be provided at feeds 66 or 70.

As will be evident, the present configuration allows the flexibility to configure the outdoor unit in various manners depending upon the capabilities of the satellite. If current satellites are not currently capable of transmitting two frequencies such as Ku and Ka band, in the future, they may be replaced by satellites that may transmit both frequencies. The present disclosure allows easy adaptation of an outdoor unit to increase the available content from various satellite positions.

While particular embodiments of the disclosure have been shown and described, numerous variations and alternate embodiments will occur to those skilled in the art. Accordingly, it is intended that the disclosure be limited only in terms of the appended claims.

What is claimed is:

1. A system comprising:
   a first satellite at a first orbital slot having a first transponder generating a first downlink signal at a first frequency and a second downlink signal at a second frequency;
   an outdoor unit directed at the first satellite comprising,
   a support structure;
   a first reflector coupled to the support structure and reflecting a first downlink signal from a first satellite, said first reflector reflecting a second downlink signal from the first satellite;
   a first feed coupled to the support structure receiving the first downlink signal;
   a frequency selective surface coupled to the support structure reflecting the second downlink signal and passing the first downlink signal therethrough;
   a second feed coupled to support structure receiving the second downlink signal reflected from the frequency selective surface.

2. A system as recited in claim 1 wherein the second downlink signal is generated by a second transponder.

3. A system as recited in claim 2 further comprising a second satellite at a second orbital slot having a third transponder generating a third downlink signal, said frequency selective surface passing the third downlink signal therethrough.

4. A system as recited in claim 3 wherein the outdoor unit comprises a third feed adjacent to the first feed coupled to the support structure for receiving the third downlink signal.

5. A system as recited in claim 3 wherein the first and third downlink signal comprises a Ka band signal.

6. A system as recited in claim 3 further comprising a third satellite at a third orbital slot having a fourth transponder generating a fourth downlink signal, said frequency selective surface passing the fourth downlink signal therethrough.

7. A system as recited in claim 6 wherein the outdoor unit comprises a fourth feed coupled to the support structure proximate to the first feed for receiving the fourth downlink signal.

8. A system as recited in claim 7 wherein the fourth feed is adjacent to the first feed.

9. A system as recited in claim 7 wherein the fourth feed is adjacent to the first feed opposite the third feed.

10. A system as recited in claim 7 wherein the fourth downlink signal comprises a Ka band signal.

11. A system as recited in claim 1 wherein the first downlink signal comprises a video signal.

12. A system as recited in claim 1 wherein the second downlink signal comprises a video signal.

13. A system as recited in claim 1 wherein the first downlink signal and the second downlink signal comprises a digital video signal.

14. A system as recited in claim 1 wherein the first downlink signal or second downlink signal comprises a high-definition digital video signal.

15. A system as recited in claim 1 wherein the first downlink signal comprises a digital video signal and the second downlink signal comprises a high-definition digital video signal.

16. An outdoor unit comprising:
a support structure;
a first reflector coupled to the support structure and reflecting a first downlink signal from a first satellite, said first reflector reflecting a second downlink signal from the first satellite;
a first feed coupled to the support structure receiving the first downlink signal;
a frequency selective surface coupled to the support structure reflecting the second downlink signal after the first reflector and passing the first downlink signal therethrough;
a second feed coupled to support structure receiving the second downlink signal reflected from the frequency selective surface.

17. An outdoor unit as recited in claim 16 wherein the first downlink signal comprises a Ku band signal and the second downlink signal comprises a Ka band signal.

18. An outdoor unit as recited in claim 16 wherein the first reflector reflects a third downlink signal, said frequency selective surface passing the third downlink signal therethrough.

19. An outdoor unit as recited in claim 18 wherein the outdoor unit comprises a third feed adjacent to the first feed coupled to the support structure for receiving the third downlink signal.

20. An outdoor unit as recited in claim 19 wherein the first and third downlink signal comprises a Ka band signal.

21. An outdoor unit as recited in claim 18 wherein the reflector reflects a fourth downlink signal, said frequency selective surface passing the fourth downlink signal therethrough.

22. An outdoor unit as recited in claim 21 wherein the outdoor unit comprises a fourth feed coupled to the support structure proximate to the first feed for receiving the fourth downlink signal.

23. An outdoor unit as recited in claim 22 wherein the fourth feed is adjacent to the first feed.

24. An outdoor unit as recited in claim 22 wherein the forth feed is adjacent to the first feed opposite the third feed.

25. An outdoor unit as recited in claim 22 wherein the fourth downlink signal comprises a Ka band signal.

26. An outdoor unit as recited in claim 16 wherein the first downlink signal comprises a video signal.

27. An outdoor unit as recited in claim 16 wherein the second downlink signal comprises a video signal.

28. An outdoor unit as recited in claim 16 wherein the first downlink signal and the second downlink signal comprises a digital video signal.

29. An outdoor unit as recited in claim 16 wherein the first downlink signal or second downlink signal comprises a high-definition digital video signal.

30. An outdoor unit as recited in claim 16 wherein the first downlink signal comprises a digital video signal and the second downlink signal comprises a high-definition digital video signal.

31. An outdoor unit comprising:
a support structure;
a first reflector coupled to the support structure and reflecting a first downlink signal from a first satellite along an axis, said first reflector reflecting a second downlink signal from the first satellite along the axis;
a first feed coupled to the support structure along the axis receiving the first downlink signal;
a second reflector having frequency selective surface coupled to the support structure intersecting the axis and reflecting the second downlink signal after the first reflector and passing the first downlink signal therethrough;
a second feed coupled to support structure receiving the second downlink signal reflected from the frequency selective surface.

32. An outdoor unit as recited in claim 31 wherein the first reflector reflects a third downlink signal, said frequency selective surface passing the third downlink signal therethrough.

33. An outdoor unit as recited in claim 32 wherein the outdoor unit comprises a third feed adjacent to the first feed coupled to the support structure for receiving the third downlink signal.

34. An outdoor unit as recited in claim 33 wherein the first and third downlink signal comprises a Ka band signal.

35. An outdoor unit as recited in claim 31 wherein the first reflector reflects a fourth downlink signal, said frequency selective surface passing the fourth downlink signal therethrough.

36. An outdoor unit as recited in claim 35 wherein the outdoor unit comprises a fourth feed coupled to the support structure proximate to the first feed for receiving the fourth downlink signal.

37. An outdoor unit as recited in claim 36 wherein the fourth feed is adjacent to the first feed.

38. An outdoor unit as recited in claim 36 wherein the fourth feed is adjacent to the first feed opposite the third feed.

39. An outdoor unit as recited in claim 36 wherein the fourth downlink signal comprises a Ka band signal.

40. An outdoor unit as recited in claim 31 wherein the first downlink signal comprises a video signal.

41. An outdoor unit as recited in claim 31 wherein the second downlink signal comprises a video signal.

42. An outdoor unit as recited in claim 31 wherein the first downlink signal and the second downlink signal comprises a digital video signal.

43. An outdoor unit as recited in claim 31 wherein the first downlink signal or second downlink signal comprises a high-definition digital video signal.

44. An outdoor unit as recited in claim 31 wherein the first downlink signal comprises a digital video signal and the second downlink signal comprises a high-definition digital video signal.

* * * * *